July 6, 1926.

Re. 16,378

W. F. MacGREGOR

COMBINATION HARVESTER THRASHER

Original Filed June 19, 1922 6 Sheets-Sheet 1

INVENTOR
WALLACE F. MAC GREGOR,
BY James A. Walsh,
ATTORNEY

July 6, 1926.

Re. 16,378

W. F. MacGREGOR

COMBINATION HARVESTER THRASHER

Original Filed June 19, 1922 6 Sheets-Sheet 2

INVENTOR
WALLACE F. MACGREGOR,
BY James A. Walsh,
ATTORNEY

July 6, 1926.

Re. 16,378

W. F. MacGREGOR

COMBINATION HARVESTER THRASHER

Original Filed June 19, 1922 6 Sheets-Sheet 3

INVENTOR
WALLACE F. MACGREGOR,
BY James A. Walsh.
ATTORNEY

July 6, 1926.

Re. 16,378

W. F. MacGREGOR

COMBINATION HARVESTER THRASHER

Original Filed June 19, 1922 6 Sheets-Sheet 4

INVENTOR
WALLACE F. MACGREGOR,
BY James A. Walsh,
ATTORNEY

July 6, 1926. Re. 16,378

W. F. MacGREGOR

COMBINATION HARVESTER THRASHER

Original Filed June 19, 1922 6 Sheets-Sheet 5

INVENTOR
WALLACE F. MACGREGOR,
BY James A. Walsh
ATTORNEY

July 6, 1926.
Re. 16,378
W. F. MacGREGOR
COMBINATION HARVESTER THRASHER
Original Filed June 19, 1922 6 Sheets-Sheet 6
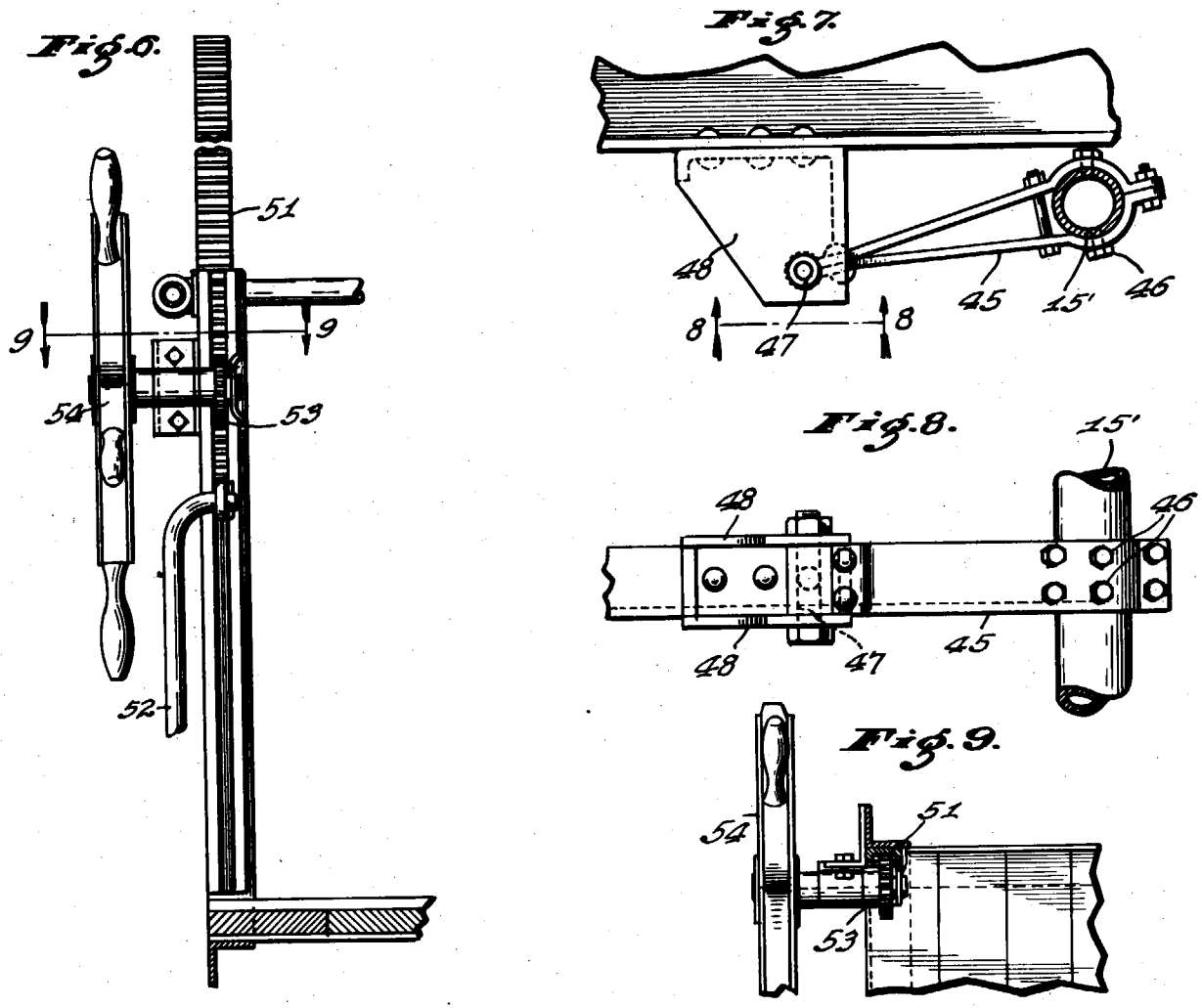
INVENTOR
WALLACE F. MACGREGOR,
BY James A. Walsh,
ATTORNEY Reissued July 6, 1926.

Re. 16,378

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Original application filed June 19, 1922, Serial No. 569,293. Renewed August 22, 1925. Original No. 1,568,679, dated January 5, 1926. Application for reissue filed February 23, 1926. Serial No. 90,214.

My invention relates to improvements in combination harvester thrashers. The invention is of particular value in connection with machines wherein the weight of the harvester or header is counterbalanced so as to facilitate the vertical adjustment of the same to vary the height of cut. The invention is also of special service in that type of machine in which the harvester unit is arranged to fold alongside the thrasher unit to provide a combined machine of small compass which may be handled, transported, or stored as a whole without the necessity of separating the harvester from the thrasher.

In its preferred embodiment, a specific object of the invention is to provide an improved construction and arrangement for effecting such counterbalancing in a machine of the folding type. For example, in the preferred embodiment herein disclosed, I effect such counterbalancing by utilizing the weight of the thrasher without the necessity of employing springs or special counterbalancing weights. It is obvious nevertheless that certain features of the invention are susceptible of wider application and of use in structures in which the counterbalancing of the harvester is effected otherwise than by the weight of the thrasher, as will be readily understood by reference to the following description and the claims appended thereto.

Figure 1:
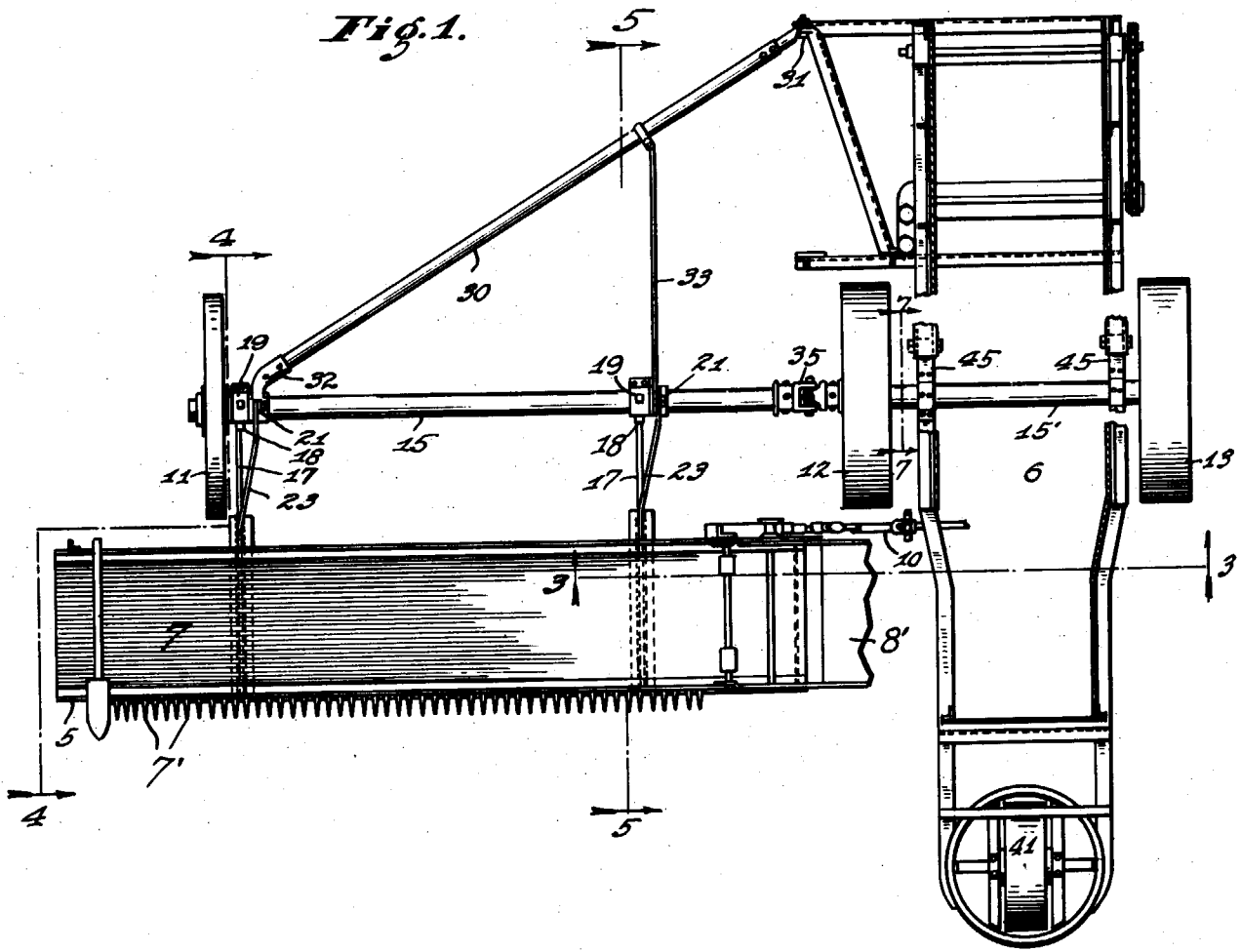
Figure 2:
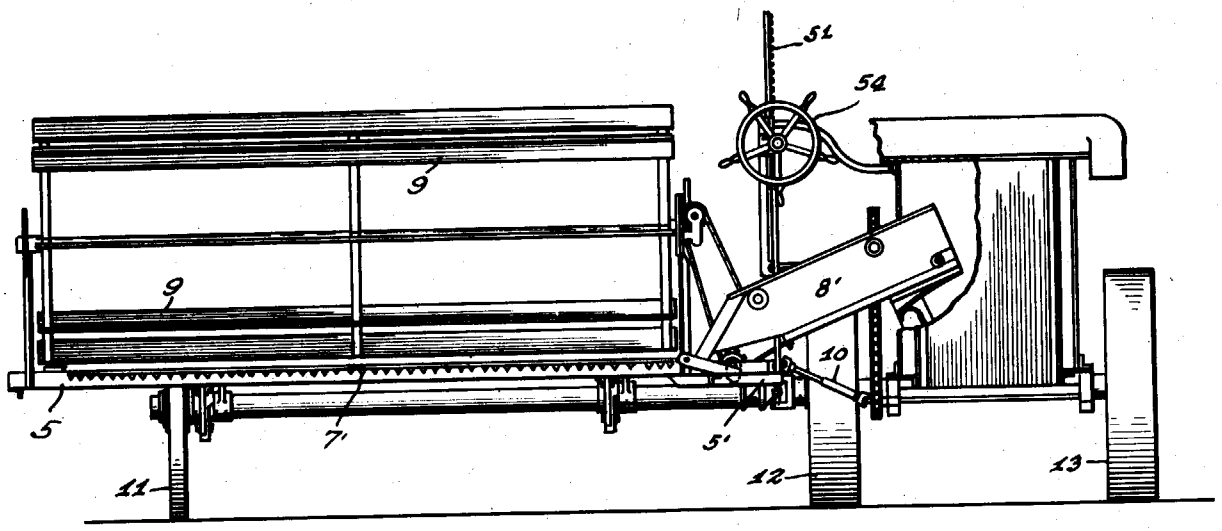
Figure 3:
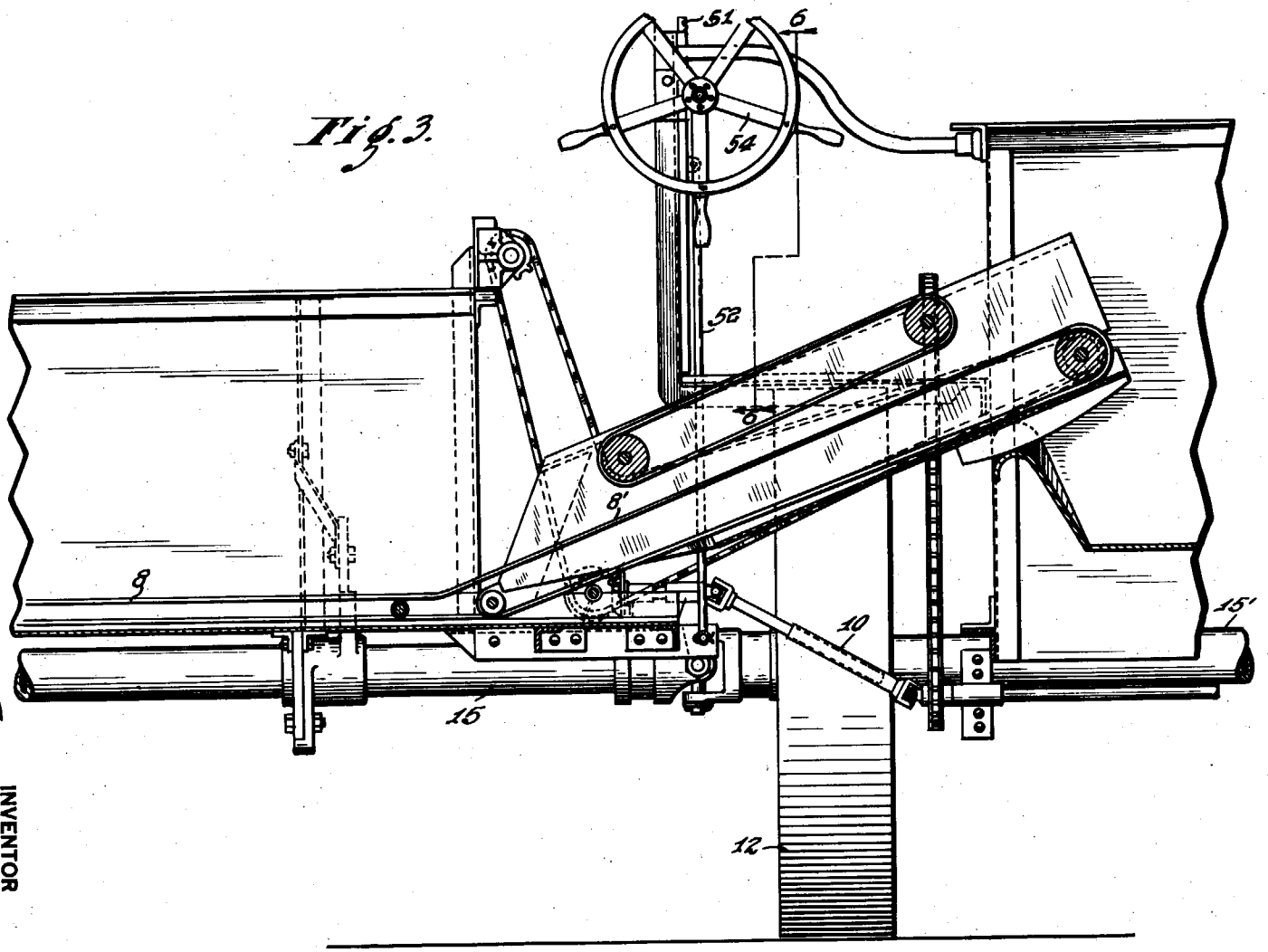
Figure 4:
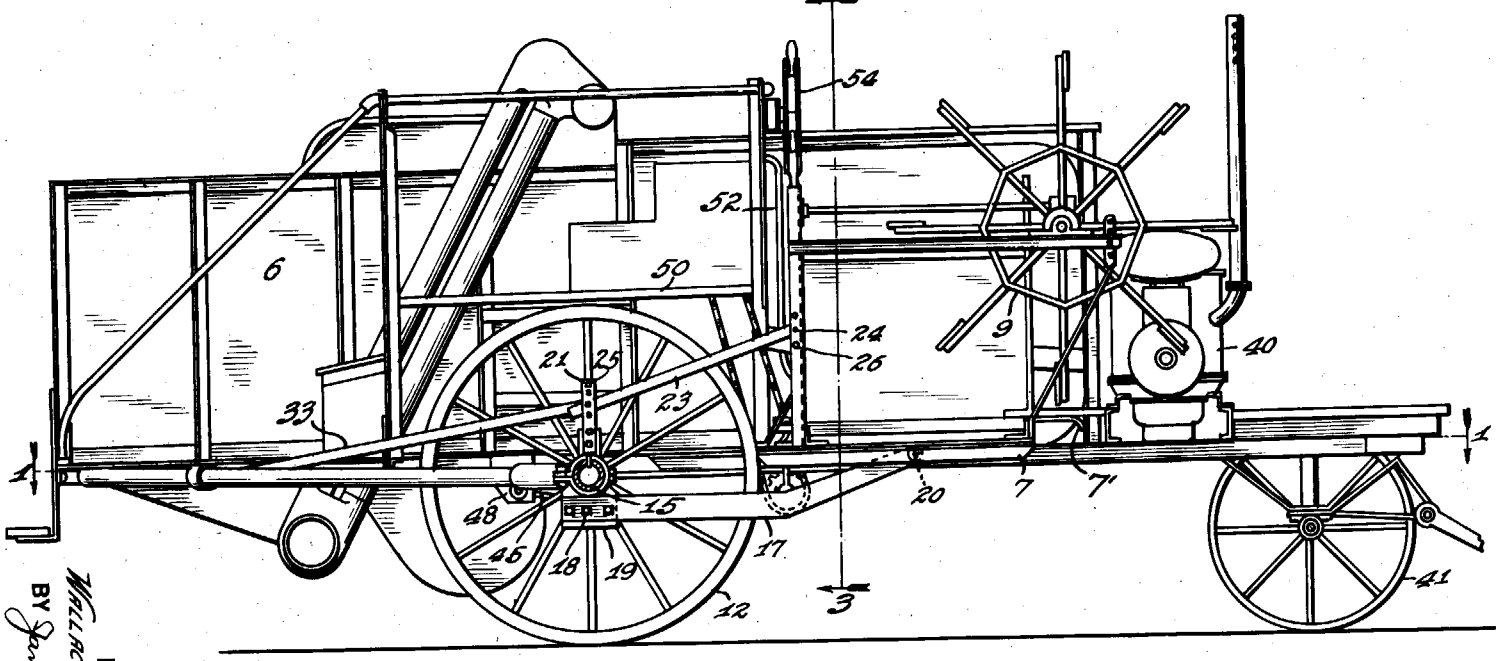
Figure 5:
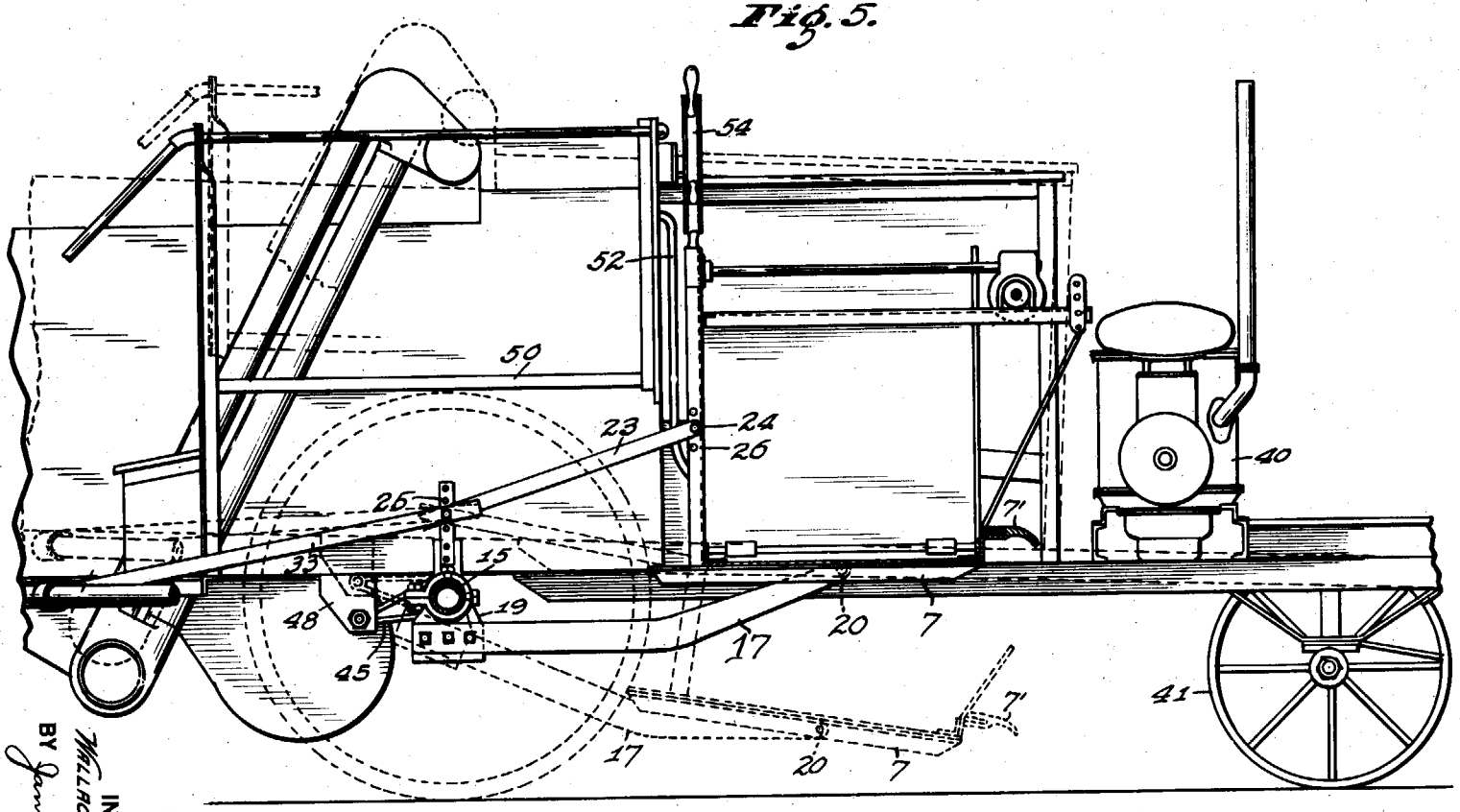

In the accompanying drawings, forming part hereof, Fig. 1 is a plan of a combination harvester-thrasher embodying my improvements, portions of the thrasher being omitted; Fig. 2, a front elevation; Fig. 3, a transverse sectional view taken on the dotted lines 3—3 in Figs. 1 and 4; Fig. 4, a side elevation of the machinery as seen when looking in the direction of the arrows 4—4 in Fig. 1; Fig. 5, a side elevation indicating in dotted lines positions in which the harvester and thrasher may be adjusted, as seen when looking in the direction indicated by the arrows 5—5 in Fig. 1; Fig. 6, a detail elevation of mechanism which I may employ for adjusting the harvester and thrasher; Fig. 7, a detail showing a lever and its connections with the thrasher and axle; Fig. 8, an under plan of said lever and connections, and Fig. 9 is a detail sectional view on the dotted line 9—9 in Fig. 6.

It will be understood that reference to the machine generally comprehends a harvester or header for cutting and gathering standing grain and delivering the same to a thrasher to be thrashed and separated, these elements being so combined as to travel together and to co-act in harvesting crops in the manner indicated. In the drawings the harvester, 5, is secured to the thrasher, 6, in the relative position as shown in Fig. 1, said harvester being of any preferred form embodying the usual platform, 7, carrier, 8, 8′, reel, 9, and other accessories and detail mechanisms for connecting and operating such parts, the end of the harvester adjacent the thrasher being connected thereto and driven by flexible means, such for example as the link 10 and associated parts, for driving the harvesting machine from the thrasher. The grain-wheel, 11, of the harvester and the carrying wheels, 12, 13, of the thrasher are mounted upon a common axle, 15, which I have shown as comprising piping which may be continuous or coupled at various points in its length as desired, but which as a whole is adapted to rotate or rock from end to end in said wheels in the manner and for the purpose to be described. The harvester 5 is fixedly supported upon the axle 15 by means of supporting members, 17, which are secured, at 18, to brackets, 19, the latter in turn being fixedly secured to said axle 15, the forward ends of said members 17 being preferably upwardly inclined and pivotally connected, at 20, to the platform 7. Also upon said axle 15 I fixedly secure standards, 21, or other suitable supporting devices upon which I mount links or supporting members, 23, which are connected at their forward ends, at 24, to the harvester 5, said supporting members being preferably adjustably attachable to the devices upon which they are mounted, as indicated by the bolt holes, 25, 26, therein appearing in Fig. 5. The supporting members 17 and 23 are in substantially parallel relation and cooperate in sustaining and guiding the harvester 5 in its various movements as will hereinafter appear, and I may further brace said harvester to the axle 15 as may be desired. Said axle 15 and the parallel members 17 and 23 in effect constitute the supporting frame for the harvester 5, but in order to insure the proper positioning of wheel 11 relatively to the thrasher 6 I connect said frame to the thrasher 6 by a detachably mounted brace-rod, 30, preferably pivotally connected to the thrasher, at 31, and to the axle 15 by a bracket, 32, pivotally mounted thereon, said brace-rod 30 and axle 15 being connected by a supporting link, 33, secured to said brace-rod and a standard 21 on the axle, which supporting link maintains standard 21 in upright position and with one of the links 23 (Fig. 1) cooperates as a continuous strengthening or thrust-rod during movements of the harvester, 5. It will be noted in Fig. 1 that the axle 15 is sectional, that is to say, it embodies a flexible joint, 35, preferably adjacent the thrasher, which device in connection with the telescoping link 10 and the pivotally connected brace-rod (at 31) permit the harvester or header, 5 through its grain-wheel 11 to oscillate, i. e. to follow undulatory or irregular ground conditions independently of the thrasher, and also as said shaft 15 in such respect is flexible and as the brace-rod 30 and supporting link 33 are detachable, it will be understood that by removing these elements the harvester or header 5 may be swung around or folded in parallel relation to the thrasher 6, in which position the harvester and thrasher elements are assembled in comparatively compact condition for storage or other purposes.

The thrasher wheels 12, 13, are mounted upon the axle section, 15′, and upon which the thrasher 6 is supported, said thrasher, as will be understood, being equipped with a motor, 40, at its forward end for actuating the thrasher and separating mechanisms thereof, as well as the harvester, the combined thrasher-harvester being drawn by animal or tractor power as desired, while the forward end of the thrasher frame is supported upon a steering-wheel, 41, as desired. Said thrasher 6 is connected to the axle portion, 15′, by one or more levers, 45, of any appropriate construction, that indicated in Figs. 5 and 7 comprising straps surrounding said axle portion 15′ and rigidly secured thereto by bolts or pins, 46, or otherwise, its end being pivotally mounted, at 47, in a bracket or hanger, 48, which is fixedly secured to the lower side of the thrasher, and as many of said devices as are considered requisite may be installed, in the present instance, two being sufficient, that is, one at each side of the thrasher, but I desire to be understood that other forms of levers or equivalent devices may be employed, the form of such devices illustrated for the purpose having been demonstrated in a practical machine of the character disclosed.

Machinery of the character under consideration it is recognized is of very weighty and cumbersome porportions requiring considerable animal or mechanical power to propel and a complement of attendants for performing the necessary operations of the machinery and handling the field material, and simplicity of operation not only is advantageous but when considering the importance of saving grain in regions in which such machinery is applicable the problem of alleviating manual labor must also be seriously considered, and my object is to reduce the difficulty of such operation and labor and consequently the cost of harvesting a crop, as the instrumentalties which I employ for adjusting the harvester and thrasher are readily responsive to slight effort of manipulation by an operator.

To facilitate the manipulation of the harvester and thrasher I assemble with the latter, adjacent to the harvester, a platform, as 50, for the accommodation of an attendant, and associated with such platform is mechanism under control of the attendant for vertically moving both the harvester and thrasher. Such mechanism may consist of any appropriate devices for the purpose, but for illustration I have shown a rack-bar, 51 positioned upon said platform, having a downwardly extending rod, 52, connected to the harvester 5, as at 5′, the rack-bar engaging a pinion, 53, which latter may be connected to a tiller-wheel, 54, or other instrumentality for raising and lowering said rack-bar and consequently harvester 5.

In operation of a combined harvester-thrasher of the character which is the subject hereof, it will be understood that the cutting and conveying mechanisms of the harvester are usually actuated by mechanisms connected to the thrasher, the thrashing and separating elements of the latter being operated from a source of power such as its motor, but such details of construction and operations being no part of my present invention will not be specifically described herein, as it is obvious that any suitable system of mechanisms may be employed for producing the necessary co-action between the harvester and thrasher for gathering and thrashing the grain, as hereinbefore indicated. However, in employing my invention to accomplish the results referred to certain simplicity of manipulation and advantageous results are attained consequent upon the arrangement and operation of my improved mechanisms for the purpose, which I will now proceed to describe. The machine as a whole—the combined thrasher and harvester or header—is drawn through the field of grain by mechanical or animal power and the selected motor power is set in operation to actuate the separating mechanisms embodied in the thrasher, the sickle or cutter-bars, 7′, of the harvester being in simultaneous operation with the thrasher through the connection of the mechanisms comprising part of both elements. As standing grain is encountered requiring cutting close to the ground by the harvester the latter is lowered or depressed by the attendant upon manipulation of the rack-bar 51 or other device for the purpose so that the cutter-bar 7′ associated with platform 7 of the harvester are in approximately the position indicated by dotted lines in Fig. 5, which position of said platform and cutter bars is maintained by the parallel supporting members 17, 23. However, such dotted lines indicate the lowermost position of the harvester platform but it will be understood that when the grain crop has been so developed as to require its cutting or heading at a considerable distance above the ground, for example, at the height indicated by the platform 7 in full lines in Fig. 4, the harvester may be vertically adjusted according to the height of the standing grain, and which work and position may be readily determined and controlled by the attendant upon platform 50, and it will be understood also that during such adjustments of the harvester its platform 7 is sustained in practically horizontal position by the supporting members 17, 23, so that the headed grain received thereon will be retained and to be conveyed to the supplemental carrier 8′ and thence into the thrasher 6. When such attendant is lowering said harvester, say to the position indicated by the dotted lines in Fig. 5, the rigid connections of the supporting members 17 with axle 15 cause said axle to turn in a clockwise direction, which turning movement throws the ends of the levers 45 upwardly, and as such levers are rigidly fixed to said axle and are connected by the brackets 48 to the thrasher 6 the result is that said thrasher body 6 is simultaneously raised as the harvester 5 is lowered, and, vice-versa, as the harvester is being raised, said thrasher at the same time is being lowered, the position of such lowering and raising of these elements being indicated by the dotted lines in Fig. 5. In this manner the increased weight of the thrasher through the simple manipulation of the levers 45 acts as a counterbalancing weight against the movement of the harvester in either direction, in other words, the weights of the two elements are counterbalanced in their opposite movements by the torsional action of axle 15, which causes levers 45 to raise and lower said thrasher at the moment when the attendant is vertically adjusting the harvester or header 5, during which latter manipulation the supporting members 17 are actuating to rock or impart torsional action to axle 15 to cause the thrasher to move vertically in a direction opposite to that of the harvester, so that said thrasher and harvester elements are being counterbalanced by the weight of the thrasher, which simple action will relieve the attendant from the otherwise arduous manual labor of endeavoring to raise and lower said harvester to meet the varied heights of grain encountered during its travel.

I claim as my invention:

1. In a combined harvester-thrasher, a supporting wheel for said thrasher, a grain wheel for said harvester, a continuous axle mounted in said wheels, and means connecting said harvester and axle by which the latter may be rocked upon the vertical movement of said harvester.

2. In a machine of the class described, a thrasher, a harvester flexibly connected thereto, an axle connecting said elements, means connecting said harvester and axle, and means connecting said thrasher and harvester for vertically moving the latter to cause its connecting means with said axle to rock the same during such movement and to simultaneously move said harvester and thrasher in opposite directions.

3. In a machine of the class described, a harvester, a thrasher, means for connecting said elements, wheels for supporting said elements, an axle mounted in said wheels, means for vertically moving said harvester, and means for simultaneously moving said thrasher in opposite directions to said harvester so that the weight of said thrasher will counterbalance the movements of said harvester.

4. In a machine of the class described, a thrasher, a harvester, an axle connected to said elements, means connecting said harvester and axle for torsionally rocking the latter when said harvester is actuated vertically, and means connecting said thrasher and axle to move said thrasher in opposite directions to said harvester upon the actuation of said axle.

5. In a machine of the class described, a thrasher, a harvester, means for flexibly connecting the same, an axle connecting said elements, substantially parallel members for supporting said harvester upon said axle, and means connecting said thrasher and harvester for vertically moving the latter whereby said supporting members rock said axle and actuate said thrasher connecting means to move said thrasher in a vertical direction simultaneously and oppositely to the movements of said harvester.

6. In a machine of the class described, a threasher, a harvester, a flexibly jointed axle connecting said elements to permit said harvester to follow ground irregularities, and means rigidly connected to said axle and pivotally connected to said harvester for permitting vertical movement of the latter and rocking movement of said axle when said harvester is vertically actuated.

7. In a machine of the class described, a harvester, a thrasher, supporting wheels for said elements, a continuous axle connecting said wheels, means connecting said harvester and axle to rock the latter, and means for connecting said thrasher and axle for vertically moving said thrasher when said axle is rocked upon the actuation of said harvester in a vertical direction.

8. In a machine of the class described, a thrasher, an axle therebeneath, means for pivotally connecting said thrasher and axle to permit vertical movement of the thrasher, a harvester connected to said thrasher, and means connected to said harvester and axle for imparting torsional motion to the latter upon the vertical actuation of said harvester to raise and lower said thrasher in opposite directions to the movements of said harvester.

9. In a machine of the class described, a thrasher, a vertically movable harvester, a rocking axle connecting said elements, and means connecting said thrasher and axle for permitting vertical movement of said thrasher upon the rocking motion of said axle whereby the weight of said thrasher counterbalances the weight of said harvester.

10. In a machine of the class described, a vertically movable harvester, a vertically movable thrasher body connected thereto, an axle for supporting said elements, and means for raising and lowering said harvester to rock said axle which in turn lowers and raises said thrasher body to counterbalance the weight of said harvester.

11. In a machine of the class described, a harvester, a thrasher connected thereto, rocking means connecting said elements, and means for vertically adjusting said harvester and actuating said rocking means to vertically adjust said thrasher.

12. In a machine of the class described, a harvester, a thrasher, an axle connecting said elements, a member connected to said axle and pivotally connected to said thrasher, and means for actuating said harvester to rock said axle and raise and lower said thrasher.

13. In a machine of the class described, a thrasher, a harvester, a common axle connecting said thrasher and harvester, pivotal means connecting said thrasher and axle and permitting vertical movement of the thrasher in relation to said axle, and means for rocking said axle.

14. In a machine of the class described, a thrasher element, an axle, a lever fixedly secured to said axle and pivotally connected to said thrasher, a supporting member fixedly secured to said axle, a harvester connected to the opposite end of said member, and mechanism for vertically adjusting said harvester to impart torsional motion to said axle for actuating said lever to vertically move said thrasher.

15. In a machine of the class described, a harvester, a thrasher, an axle, means connecting said harvester and axle for torsionally moving said axle, mechanism connecting said axle and thrasher for permitting relative vertical movement of said axle and thrasher to compensate for ground irregularities, mechanism connecting said thrasher and harvester for vertically adjusting the latter, and means associated with said mechanism for permitting manual operation thereof.

16. In a machine of the class described, a vertically movable thrasher, a vertically movable harvester, a rocking axle connecting said elements to permit the vertical movement thereof, means for rocking said axle, and means for vertically adjusting said harvester whereby said thrasher is also vertically adjusted.

17. In a machine of the class described, a thrasher having a carrying wheel, a harvester having a grain wheel, an axle embodying a universal joint connecting said wheels, and means for torsionally moving said axle to raise and lower said thrasher.

18. In a machine of the class described, a thrasher having a carrying wheel, a harvester having a grain wheel, an axle connecting said wheels, means connecting said harvester and axle for torsionally moving the latter upon the vertical movement of said harvester, and means connecting said axle and thrasher for adjusting the latter upon such torsional movement.

19. In a machine of the class described, a thrasher, a harvester, means for drivingly connecting said elements, a rocking axle supporting said harvester in offset relation and foldingly connected to the thrasher, and means for rocking said axle to adjust the height of cut.

20. In a machine of the class described, a thrasher, a harvester arranged in lateral relation thereto, flexible means for drivingly connecting said elements, an axle supporting said harvester in offset relation and means connecting said axle and thrasher for permitting said axle to oscillate vertically, to swing rearwardly for folding, and to rotate on its axis to adjust the height of cut.

21. In a machine of the class described, a thrasher, an axle section therefor, a harvester, an axle section for said harvester, means for hingedly connecting said axle sections for folding, and means for rocking said axle sections and incidentally raising or lowering said harvester.

22. In a machine of the class described, a thrasher, a rocking axle for supporting said thrasher, and means connecting said thrasher and axle to permit substantially vertical movement of said thrasher when said axle is rocked.

23. In a combined harvester-thrasher, a supporting wheel for said thrasher, a grain wheel for said harvester, a continuous axle mounted in said wheels, means connecting said thrasher and axle, means connecting said harvester and axle, and means for adjusting said axle and harvester to vertically adjust said thrasher.

24. In a machine of the class described, a harvester, a thrasher, supporting wheels for said elements, a continuous rocking axle connecting said wheels, means for connecting said harvester and axle for vertically moving said harvester, and means for connecting said thrasher and axle for vertically moving said thrasher when said axle is rocked.

25. In combination, a main unit comprising a thrasher provided with a rock member, an axle normally extending laterally from said main unit operatively connected to said rock member and foldingly connected to said main unit, a harvester unit mounted on one side of said axle, and means connected to the rock member for balancing said axle against torsional movement due to the offset weight of the harvester.

26. In combination, a thrasher unit which includes a member mounted thereon to rock on a horizontal axis extending cross-wise of the line of draft, an axle extending laterally from said thrasher unit and foldingly connected thereto, a harvester unit mounted on one side of said axle, means for transmitting torsional movement of said axle to said rock member, and counterbalancing means associated with said rock member for balancing said axle against torsional movement due to the offset weight of the harvester.

27. In combination, a main thrasher unit which includes thrashing mechanism, a member mounted on said unit to rock on a horizontal axis extending crosswise of the line of draft, an axle extending laterally from said main unit and hingedly connected to said rock member whereby said axle may oscillate in a vertical plane and also may fold alongside the thrasher unit, a harvester unit mounted on one side of said axle, and counterbalancing means operating upon the rock member for balancing said axle against torsional movement due to the offset weight of the harvester.

28. In combination, a main thrasher unit which includes thrashing mechanism, a member mounted on said unit to rock on a horizontal axis extending crosswise of the line of draft, an axle extending laterally from said main unit and foldingly connected to said rock member, a harvester unit mounted on one side of said axle, manual means for raising or lowering said harvester unit and incidentally rocking said axle, and counterbalancing means operating upon the rock member for balancing said axle against torsional movement due to the offset weight of the harvester.

29. In combination, a main thrasher unit which includes thrashing mechanism, and a harvester unit which includes a grain wheel therefor, a harvester and a supporting member for the latter, said harvester unit being hingedly connected to the thrasher unit so as to fold and also so as to allow said grain wheel to follow ground irregularities, the said member supporting the harvester in offset relation and being mounted for rocking movement on a horizontal axis to adjust the height of cut, the arrangement including counterbalancing means on the thrasher unit and connected to said member for resisting rotation of the latter due to the offset weight of the harvester and effective throughout the range of said adjustment.

30. In a combined harvester and thrasher, the combination of a thrasher unit provided with a rock member, an arm normally extending laterally from said thrasher unit and foldingly connected thereto and hinged so as to permit relative oscillation in a vertical plane, a harvester mounted on one side of said arm and means connecting the arm and the rock member whereby force applied to said rock member serves to counterbalance said arm against torsional movement due to the offset weight of the harvester.

31. In a machine of the class described, a thrasher, a harvester arranged in lateral relation thereto, driving means flexibly connecting said elements, a grain wheel for the harvester, an axle journaled in said grain wheel supporting and connected to said harvester to rock therewith and pivotally connected to said thrasher to permit the grain wheel to follow ground irregularities and to be swung to folded position alongside the thrasher, the harvester being offset on one side of said axle, and means tending to rock said axle to counterbalance the weight of the harvester.

32. In a machine of the class described, a thrasher, a harvester arranged in lateral relation thereto, driving means flexibly connecting said elements, an axle supporting and connected to said harvester to rock therewith and pivotally connected to said thrasher to permit the harvester to rise and fall and to be swung to folded position alongside the thrasher, the harvester being positioned on one side of the axle, and means tending to rock said axle to counterbalance the weight of the harvester, and located on the thrasher side of the axle pivot.

33. In a combined harvester-thrasher the combination of a thrasher support, a harvester support, a harvester carried by said harvester support in offset relation thereto, an arm connected to said harvester support and provided with means for counterbalancing the offset weight of the harvester, an axially-vertical hinge means connecting said harvester support with the thrasher support and said arm whereby said harvester support may be folded relative to said thrasher support and said arm.

34. In a machine of the class described, a thrasher, a support oscillatably, foldingly, and rotatably connected to said thrasher, arms secured to said support and movable therewith, a harvester connected to said arms and adapted to move up or down upon the rotation of said support, a grain wheel in which said support is rotatably carried, and means connecting said thrasher and harvester for raising and lowering the latter.

35. In a combined harvester-thrasher the combination of a two-wheeled thrasher support, a harvester support, a grain wheel for carrying the outer end of said harvester support, a harvester carried by said harvester support in offset relation thereto, an arm connected to said harvester support and provided with means for counterbalancing the offset weight of the harvester, and axially vertical hinge means connecting said harvester support with the thrasher support and said arm whereby said harvester support may be folded relative to said thrasher support and said arm, said harvester support being oscillatably connected to said thrasher support to permit said ground wheel to follow ground irregularities.

36. In a combined harvester and thrasher, the combination of a wheeled thrasher support, a harvester supporting arm extending laterally from said thrasher support and hinged thereto to permit folding of said arm alongside the thrasher support, a harvester carried by said arm and adapted to be raised and lowered to vary the height of cut, and counter-balancing means for the harvester located on the support whereby the unobstructed folding of said arm is permitted.

37. In a combined harvester and thrasher, the combination of a wheeled thrasher support, a harvester supporting arm extending laterally from said thrasher support and hinged thereto to permit folding of said arm alongside the thrasher support, a harvester carried by said arm, and adapted to be raised and lowered to vary the height of cut, a grain wheel on the outer end of said arm, the arm being so connected to said support as to permit the grain wheel to follow the ground irregularities, and counterbalancing means for the harvester located on the support whereby the unobstructed folding of said arm is permitted.

In testimony whereof I affix my signature.

WALLACE F. MacGREGOR.